United States Patent [19]

Wildner

[11] Patent Number: 5,058,377

[45] Date of Patent: Oct. 22, 1991

[54] TURBORAMJET ENGINE

[75] Inventor: Walter Wildner, Munich, Fed. Rep. of Germany

[73] Assignee: MTU Motoren- und Turbinen-Union Munchen GmbH, Fed. Rep. of Germany

[21] Appl. No.: 505,049

[22] Filed: Apr. 5, 1990

[30] Foreign Application Priority Data

Apr. 14, 1989 [DE] Fed. Rep. of Germany ....... 3912392

[51] Int. Cl.$^5$ .......................... F02K 3/00; F02C 1/02
[52] U.S. Cl. ...................................... 60/224; 60/225; 60/270.1
[58] Field of Search ..................... 60/224, 225, 270.1

[56] References Cited

U.S. PATENT DOCUMENTS 2,516,910  8/1950  Redding ............................... 60/244
2,955,414 10/1960  Hausmann ............................ 60/244

Primary Examiner—Louis J. Casaregola
Assistant Examiner—Laleh Jalali
Attorney, Agent, or Firm—Evenson, Wands, Edwards, Lenahan & McKeown

[57] ABSTRACT

A turbine ramjet engine is provided which has a ram pressure air duct shrouding the basic turbo-engine in an annular manner. When the ramjet operation is disconnected, this ram pressure air duct, while at the same time intake air is released into the basic engine, is blocked off with respect to the supply of ram pressure air. It is provided to unblock or block an intake-side air inflow cross-section of the basic engine by the axial adjustment of a drop-shaped body with respect to a flow divider. A ring slide is provided which is axially adjustable to always be opposite this body which blocks the ram pressure air duct when the inflow cross-section of the basic engine is unblocked and unblocks it when the inflow cross-section is blocked. In addition, the ram pressure air duct is to be widened in a multicornered manner in the upstream direction at the level of a blocking zone caused by a local overtravelling of countersurface of the mentioned body and the ring slide.

23 Claims, 2 Drawing Sheets

TURBORAMJET ENGINE

BACKGROUND AND SUMMARY OF THE INVENTION

The invention relates to a turboramjet engine having a ram pressure air duct shrouding the basic turbo-engine in an annular manner, this ram pressure air duct, when the ramjet operation is disconnected, while at the same time intake air is released into the basic engine, being blocked with respect to the supply of ram pressure air.

Recently, combined turboramjet engines have been regaining importance, specifically within the framework of so-called "hypersonic flight concepts" with an extremely high mission spectrum from the start to a high supersonic speed at high flying altitudes (up to an altitude of approximately 30 km). Among other concepts, the hypersonic flight concepts include a space flight equipment concept (Sänger Project) which, as will be described in the following, amounts to a two-stage concept. The first stage is to be carried by a flight apparatus which operates only within the atmosphere, while the second stage is based on a useful-load flight apparatus which is taken along in a "piggyback" manner by the mentioned flight apparatus. The useful-load flight apparatus, for use in space missions, has the purpose of continuing its assigned flight path on its own in the upper range of the atmosphere by way of a suitable rocket propulsion system. The flight apparatus responsible for the first stage must therefore be able to return, must be reusable, and carries out starts and landings like a conventional airplane.

In the case of combined turboramjet engines which are to be used, for example, for a flight apparatus of this type the turbojet engine must generally be switched off continuously, and the respective ramjet engine must be switched on continuously when a flying speed of approximately Mach 3 is reached in order to reach the desired high supersonic or hypersonic speeds of up to Mach 4.5 or even higher only by means of the latter. Flying speeds of approximately Mach 2 or even higher may be reached in this case in a combined operation of "a turbojet engine with a switched-on afterburner". The afterburner which, for this purpose, is advantageously connected behind the turbojet engine part or behind the basic turboengine and, if necessary, is acted upon by a combination of compressor air parts and engine exhaust gas, may form the driving system for the ramjet operation by means of the connection of additional fuel injection devices, in addition to flame stabilizers, with a correspondingly apportioned exclusive ram pressure supply when the turbojet engine part is disconnected.

In this case, the ram pressure air supply to a common afterburning/ramjet combustion chamber connected behind the basic turbo-engine may take place by way of a ram pressure air duct extending in parallel to or in a coaxial shroud with respect to the basic engine. This ram pressure air duct, while at the same time continuously releasing the required air flow into the basic engine, would have to be blocked or vice versa. For operational reasons, a reliable temperature resistant blocking of the basic engine must be ensured during an exclusive ramjet operation with respect to the ram pressure air duct, particularly with respect to the comparatively high temperatures of approximately up to 1,700 degrees C or even above which exist in it. This blocking relates to the air intake side but also to the exhaust gas outlet side of the basic turbo-engine with respect to the ram pressure air flow which locally flows together behind it to the afterburning/and supplementary burning device.

Concerning the blocking devices to be selected, it is particularly important in the case of such a combined engine concept that continuous "smooth" change-over load phases from the one operating method (gas turbo-engine operation/ramjet operation or ramjet operation/gas turbo-engine operation) are ensured. Specifically, this can be ensured without, as a result, having to cause engine dimensions which take up a lot of space as a result of their circumference, among other reasons, also with respect to an increased end face resistance. In order to prevent an unacceptably strong thrust decay in the critical change-over phases, a ram pressure and intake pressure supply must be still available for the ramjet propulsion system as well as for the basic turbo-engine system respectively which is still sufficient for the respective continuous switching-off.

Concerning the blocking devices to be selected in the case of an engine concept of this type, a construction is important which is not susceptible to disturbances and has relatively few moving components together with the pertaining adjusting devices. Among other things, this has the purpose of assessing the danger of a component breakage to be as low as possible in order to prevent, if possible, that fragments are taken in by the compressor of the basic engine and may thus cause considerable damage to the engine.

It is an object of the invention to provide a combined gas turbine ramjet engine by means of which the different operating methods (ramjet operation/turboengine operation) can be reliably controlled, particularly in the critical change-over phases from one operating method to the other, without any unacceptable thrust decay. In this case, particularly on the air intake side, a reliable blocking of the basic turboengine is to be achieved with respect to the ram pressure air supply released in this case.

According to the invention, this object is achieved by providing an arrangement wherein an intake side air inflow cross-section (Z) of the basic engine is unblocked or blocked with respect to the flow divider by the axial adjustment of a drop-shaped body, wherein a ring slide is provided which is axially adjustable to always be opposing this drop-shaped body, this ring slide blocking the ram pressure air duct when the inflow cross-section (Z) of the basic engine is unblocked and unblocking it when the inflow cross-section (Z) is blocked, and wherein the ram pressure air duct is widened in a multicornered manner in the upstream direction at the level of a blocking zone caused by the local overtravelling of countersurfaces of this drop-shaped body and the ring slide.

By using an annular ram pressure air duct which causes a relatively minor widening of the diameter of the overall engine, the different operating methods may be controlled perfectly without having to accept any significant end face widening of the overall engine which is connected with reductions in performance.

Among other things, it is also achieved that an aerodynamically perfect air intake geometry for the compressor is made available when the ramjet engine or the propulsion system is disconnected and when only the gas turbo-engine is operating.

According to the invention, it is particularly advantageous that particularly the blocking devices arranged on the air intake side (drop-shaped central body/ring slide), as the critical change-over phases, are constructed to be controlling continuously in opposing movement phases without causing any thrust decay. A significant contribution to solving this problem is the indicated local widening of the annular shroud (ramjet pipe) carrying the ram pressure air in the form of a contour ending in a multicornered manner in such a way, during a mutual overtravelling and blocking phase of both slide devices caused during the change-over operation, the ring slide has always moved so far into the spatial widening that in this phase—between the ring slide and local zones of the widening of the outer shroud—sufficiently large parts of air can flow off into the ram pressure air duct and into the basic turbo-engine.

Other objects, advantages and novel features of the present invention will become apparent from the following detailed description of the invention when considered in conjunction with the accompanying drawings.

DETAILED DESCRIPTION OF THE DRAWINGS

Figure 1:
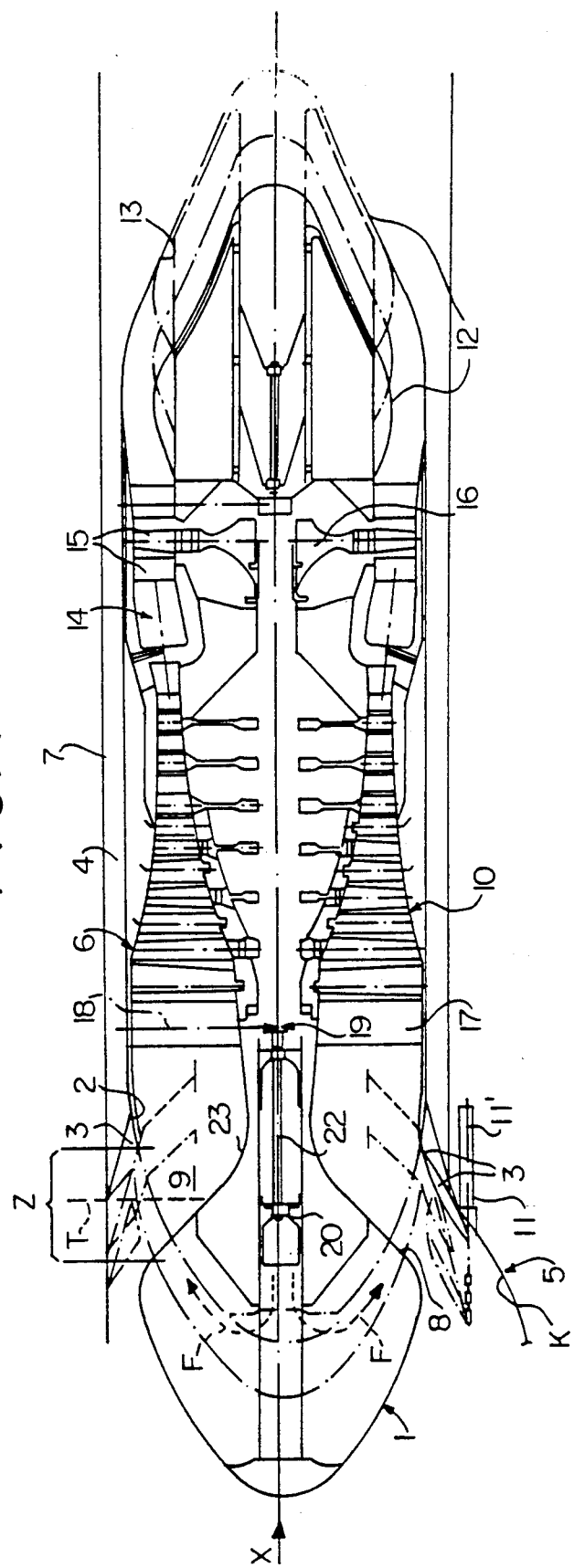
FIG. 1 is a sectional schematic view taken along plane A—A of FIG. 2 and showing a combined gas turbine ramjet engine with blocking and control devices for controlling the two different operating methods of this engine, constructed according to a preferred embodiment of the invention.
Figure 2:
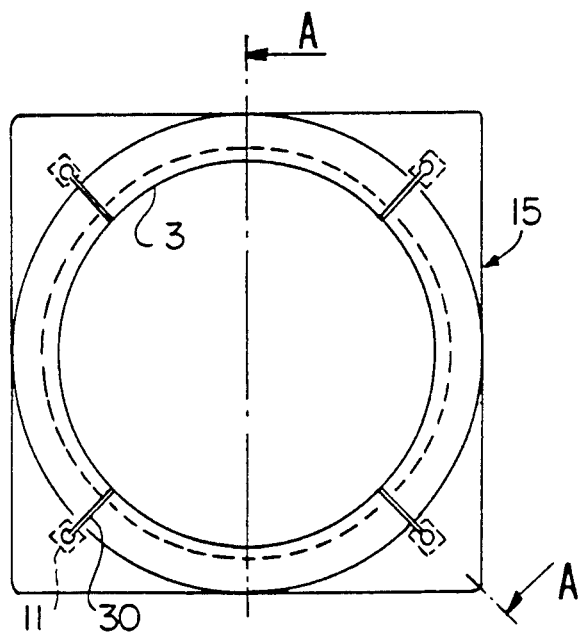
FIG. 2 is a frontal view taken in the viewing direction X of the engine of FIG. 1.

FIG. 1 shows a combined gas turbine ramjet engine having a ram pressure air duct 4 shrouding the respective basic turbo-engine (among others, including the high-pressure compressor 10). When the ramjet operation is switched off, the ram pressure air duct 4, while at the same time releasing intake air by way of an inflow cross-section Z into the respective basic engine, must be blockable with respect to the supply of ram pressure air. According to the basic idea of the invention, the air inflow cross-section Z of the basic turbo-engine, on the intake side, must be unblockable or blockable by the axial adjustment of a drop-shaped body 1 with respect to a local flow divider 2. Frontally, the mentioned flow divider 2 forms an inlet lip for the basic turbo-engine and may otherwise be considered to be an upstream continuation of the interior shroud 6 of the basic turbo-engine. The ram pressure air duct is therefore formed between an exterior annular duct enclosure 7 and the above-mentioned interior shroud 6 of the basic turbo-engine. Also, according to the basic idea of the invention, a ring slide 3 is to be provided which is always axially adjustable in the opposite direction of the drop-shaped body 1, blocks the ram pressure air duct 4 when the inflow cross-section Z of the basic turbo-engine is unblocked, and unblocks it when the inflow cross-section Z is blocked. It is particularly important for the functioning of the invention that the ram pressure air duct 4, at the level of a blocking zone T caused by a local overtravelling of the countersurface of the drop-shaped body 1 and of the ring slide 3, is widened in a multicornered manner in the upstream direction. This is the widening which according to FIG. 3 together with FIG. 1 has the reference number 5 and which, according to FIG. 3, consists, for example of straight surface sections W or conical surface sections K which locally are distributed over the circumference. Therefore, according to FIGS. 2 and 3, a widening part of the exterior cylindrical duct shroud 7 (ramjet pipe) is formed which, in the upstream direction, ends in a four-cornered or square manner.

As also shown in FIG. 1, the ring slide 3 forms a ring which is profiled to be conically widened in the upstream direction and which in the blocking position—between the flow divider 2 and the adjacent countersurfaces of the shroud 7 and its widening 5—forms a sloping guiding section for the intake air when the inflow cross-section Z is exposed.

Figure 3:
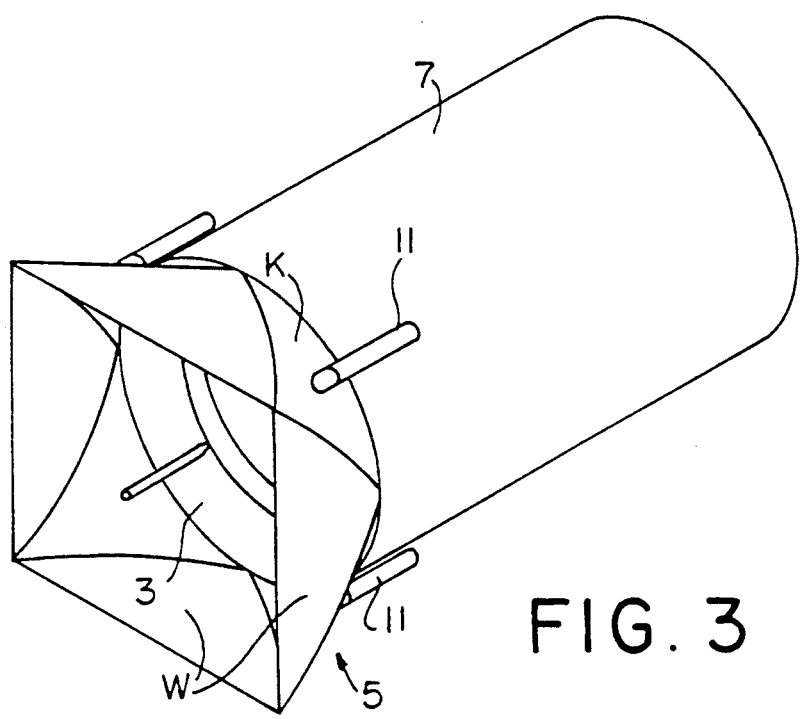
FIG. 3 is a schematic perspective view of the exterior cylindrical engine shroud (ramjet pipe) of the engine of FIGS. 1 and 2, together with a widening which ends in a four-cornered manner, particularly as a square in this case.

As pointed out above with respect to FIG. 3, the widening 5 must have conical surfaces K which are locally distributed over the circumference, according to which the widening must therefore be constructed to be partially conical and is therefore designed to be adapted to the respective conical shape of the ring slide 3.

As shown on the bottom of FIG. 1, the ring slide is sealingly disposed backwards on the corresponding conical surfaces K when the ram pressure air duct 4 is in the blocked position.

The required inflow cross-section for the intake air into the basic engine may be formed between an exterior circumferential wall section of the drop-shaped body 1 and a lip-type front edge of the flow divider 2, on the one side, and respective local wall parts of the exterior duct shroud 7. Therefore, when the annular inflow cross-section Z is unblocked and the ram pressure air duct 4 is blocked, an annular air intake duct 9 of the compressor 10 of the basic engine is formed between a convergent circumferential wall section 8 of the drop-shaped body 1 and a slanted guiding section of the ring slide 3 together with local sections of the flow part 2.

The above-mentioned drop-shaped body 1 may also be called a central body arranged in a rotationally symmetrical manner coaxially with respect to the engine axis and divergent/convergent in the direction of the air flow.

As also shown in FIG. 1, when the basic turbo-engine is disconnected and only the ramjet is operating, the whole inflow cross-section for ram pressure air into the ram pressure air duct 4 is to be constructed to be torus-shaped when the ring slide 3 is axially moved out completely; i.e., to be torus-shaped between the slide and the drop-shaped body on one side as well as in sections between rearward surface sections of the ring slide 3 and adjacent wall sections of the widening 5 which is constructed to end in a multicornered or square manner.

As shown particularly in FIG. 3, the ring slide 3 can be actuated by means of several adjusting elements 11, in this case, for example, four adjusting elements 11 uniformly distributed over the circumference of the shroud 7 of the ram pressure air duct 4. These adjusting elements may, for example, be pneumatic or hydraulically actuated adjusting cylinders. Tension-pressure rods 11' (FIG. 1) which interact with the mentioned adjusting elements 11, with a local sealing effect, in this case, may be guided through openings in the widening and may be connected with the ring slide 3 via struts 30. The adjusting movement of the ring slide 3 may, however, also take place, for example, by motor-driven ball roller spindles which act upon the ring slide 3 by way of correspondingly assigned tension-pressure rods or similar adjusting members. Therefore, in this case, the adjusting force for the ring slide 3 with respect to the overall circumference of the exterior cylindrical duct shroud 7 may be transmitted by the motor by means of a flexible shaft and adjusting gears inserted in this shaft, from one point to the corresponding ball roller spindles, the respective adjusting gears having nuts for driving the ball roller spindle which are rotatably disposed and driven in the adjusting gears.

According to FIG. 1, the device for the selective blocking or unblocking of the air inflow cross-section Z and of the ram pressure air duct 4 may also be provided in combination with another drop-shaped or mushroom-shaped slide 12 which can be axially moved in an adapted manner and is axially as well as symmetrically connected behind the basic engine. During an exclusive ramjet operation and while the inflow cross-section Z of the basic engine is blocked off and the ram pressure air duct 4 is unblocked, the slide 12 has the purpose of blocking off an annular nozzle outlet opening 13 of the basic engine with respect to the ram air flow which flows together downstream of this slide out of the ram pressure air duct 4. Therefore, in FIG. 1, the contour of the slide 12 which is indicated by an interrupted line and is disposed the farthest to the right forms the blocking position of the nozzle outlet opening 13, while the position of the slide 12 which, in FIG. 1, has moved in the farthest to the left and is indicated by a drawn-out line, represents the full unblocked position of the nozzle outlet opening 13.

When, for example, the engine is changed over from the turbojet engine operation to the ramjet operation, the drop-shaped body 1, while increasingly reducing the inflow surface Z, is moved, more and more against the front face or the inlet lip of the flow divider 2 while, at the same time, the ring slide 3 is increasingly moved out axially in the opposite direction of the adjusting movement of the body 1 in order to increasingly unblock the ram pressure air duct. In this case, a mutual surface overtravelling occurs in the indicated zone T between the ring slide 3 on one side and the exterior circumferential surface of the drop-shaped body 1 which blocks the air supply. By way of the above-mentioned widening 5 of the exterior duct shroud 7 of the engine, it is therefore possible to supply the ring slide 3, in this above-described mutual air blocking phase, locally along its exterior surface, with supplied air in such a manner that the basic engine and also the ram pressure air duct may already be supplied with the correspondingly required amounts of air in this phase.

As mentioned above, the basic turbo-engine comprises an axial compressor 10, specifically a multistage axial compressor. An annular combustion chamber 14 arranged coaxially with respect to the engine axis is connected behind the axial compressor 10, the generated combustion gas from this annular combustion chamber 14 being supplied to a single-stage axial turbine 15. The impeller 16 of the axial turbine 15 drives the axial compressor 10 by means of a drum-type hollow-shaft system.

Hollow supporting blades 17 are connected in front of the axial compressor, a drive shaft 18 being guided through one of these hollow supporting blades 17. In order to axially adjust the drop-shaped body 1, the mentioned drive shaft 18 transmits the driving power by way of a miter gear to a ball roller spindle 20 on which the nut 22 is disposed which translates the rotating movement of the ball roller spindle into an axial adjusting movement of the drop-shaped body 1. A fixed interior section of the local intake duct 9 has the reference number 23 in FIG. 1. This interior section 23 continues flush with the surface wall with respect to the surface contour 8 of the drop-shaped body 1 when this body 1 is situated in the axially fully moved-out position.

The drop-shaped body 1 shown in FIG. 1 as well as, for example, also the ring slide 3 may be made of a high-temperature-resistant material. According to the invention, this material may preferably be a ceramic composite fiber glass material.

Depending more or less on the selection of the temperature-resistant material, the drop-shaped body 1 as well as the ring slide 3 may be cooled, specifically, in each case, in the end position which is relevant to the ramjet operation in which therefore the drop-shaped body 1 is axially moved in as far as possible, while the ring slide is axially moved out as far as possible. In this case, the drop-shaped body 1, for example, may be cooled by means of air of a suitable pressure bled from the engine inlet, with the prerequisite that the required cooling temperature of this bled air is obtained, for example, by way of a heat exchange process of the bled air with the fuel that is carried along, such as hydrogen. The cooling air which is cooled down in this manner may be centrally supplied to the drop-shaped body 1, for example, by way of the hollow supporting blades 17, or by way of one or several of these blades, and may be blown off from there according to the arrows F against the surface of this body 1. In the same manner, the slide 12 may also be subjected to this type of cooling or a similar cooling.

The above-mentioned type of blocking device and of slide cooling is also an object of the present invention.

According to the invention, the downstream mushroom-shaped or drop-shaped body or slide 12 may also be cooled in the manner indicated with respect to the drop-shaped body 1.

It is also noted that the two bodies or slides 1 and 12 are always arranged to be secured against twisting in a circumferential direction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A turbine ramjet engine having a ramjet and turbo operation comprising:

a turbo engine, having an air intake cross-section of an air inlet, including a compressor means, a combustion chamber means and a turbine means operatively arranged together;

an annular ram pressure air duct, having a circular end section, coaxially shrouding said turbo engine, said ram pressure air duct being blocked from a supply of ram pressure air when the ramjet operation is disconnected while intake air is simultaneously released into said compressor means;

a flow divider, located between said turbo engine and said ram pressure air duct, having a lip;

a central body, arranged in the turbine-ramjet engine having an upstream portion which diverges and then converges in a downstream direction, and being axially adjustable relative to the flow divider to block and unblock the air intake cross-section of the turbo engine;

a tapering ring slide, widened in the upstream direction, being axially controllable to position itself opposite said central body, wherein said ring slide is adapted to block said ram pressure air duct between said lip and said circular end section when the air intake cross-section is unblocked and to unblock said ram pressure air duct when the air intake cross-section is blocked, wherein said annular ram pressure air duct includes an outer cylindrical wall member which widens in the upstream direction from a circular cross-section at said circular end section to a polygonal cross-section having corner zones, such that at a blocking zone level resulting from mutual overtraveling of said ring slide and said central body, free flow through passages remain between said ring slide and the corner zones of said polygonal cross-section of said outer cylindrical wall.

2. An engine according to claim 1, wherein said polygonal cross-section is a square.

3. An engine according to claim 1, wherein the ring slide is a ring having a conically widened profile in the upstream direction forming a sloped guiding section for the intake air between the flow divider and adjacent countersurfaces of the ram pressure air duct and its outer cylindrical wall member when blocking said ram pressure air duct.

4. An engine according to claim 3, wherein the outer cylindrical wall member includes partially conical surface portions adapted to said conically widened profile of said ring.

5. An engine according to claim 1, wherein said air intake cross-section is formed at one section of said air inlet between an exterior circumferential wall section of said central body and a front edge of said lip of said flow divider, and at another section between said central body and said outer cylindrical wall member.

6. An engine according to claim 1, wherein said central body is rotationally symmetrical coaxially with respect to the engine axis.

7. An engine according to claim 1, further comprising a ram air inflow cross-section for a ram inlet into said ram pressure air duct, said ram air inflow cross-section defined between said ring slide in an upstream most position and said central body as well as in sections between rear surface sections of said ring slide and adjacent wall sections of said outer cylindrical wall member.

8. An engine according to claim 1, wherein the ram pressure air duct is formed between an interior wall shrouding the turbo engine and said outer cylindrical wall member.

9. An engine according to claim 8, wherein said polygonal cross-section is a square.

10. An engine according to claim 5, wherein, when said air intake cross-section is unblocked and the ram pressure air duct is blocked, a convergent circumferential wall section of said central body, a sloped guiding section of said ring slide, together with sections of said flow divider, are components of an annular air intake duct of the compressor of the turbo engine.

11. An engine according to claim 1, further comprising:

a plurality of adjusting elements actuating said ring slide uniformly arranged on an outer circumference of said ram pressure air duct and including tension pressure rods coupled to said ring slide through openings in said outer circular member in a locally sealing member.

12. An engine according to claim 1, wherein a device for the selective blocking or unblocking of the air intake cross-section and of the ram pressure air duct is provided in combination with a second central body which can be axially moved in an adapted manner and is axially symmetrically connected behind the turbo engine, said second central body, during an exclusive ramjet operation and when the air intake cross-section is blocked and said ram pressure air duct is unblocked, blocks an annular nozzle outlet opening of the turbo engine with respect to ram air flow which flows together downstream of said second central body out of the ram pressure air duct.

13. An engine according to claim 1, wherein at least one of the central body and second central body and the ring slide are made of a temperature-resistant material, particularly of a ceramic composite material reinforced by fiber glass.

14. An engine according to claim 4, wherein said air intake cross-section is formed at one section of said air inlet between an exterior circumferential wall section of said central body and a front edge of said lip of said flow divider, and at another section between said central body and said outer cylindrical wall member.

15. An engine according to claim 14, wherein said central body is rotationally symmetrical coaxially with respect to the engine axis.

16. An engine according to claim 15, further comprising a ram air inflow cross-section for a ram inlet into said ram pressure air duct, said ram air inflow cross-section defined between said ring slide in an upstream most position and said central body as well as in sections between rear surface sections of said ring slide and adjacent wall sections of said outer cylindrical wall member.

17. An engine according to claim 16, wherein, when said air intake cross-section is unblocked and the ram pressure air duct is blocked, a convergent circumferential wall section of said central body, a sloped guiding section of said ring slide, together with sections of said flow divider, are components of an annular air intake duct of the compressor of the turbo engine.

18. An engine according to claim 11, wherein a total of four of said adjusting elements are provided.

19. An engine according to claim 10, further comprising:

a plurality of adjusting elements actuating said ring slide uniformly arranged on an outer circumference of said ram pressure air duct and including tension pressure rods coupled to said ring slide through openings in said outer circular member in a locally sealing manner.

20. An engine according to claim 16, wherein a device for the selective blocking or unblocking of the air intake cross-section and of the ram pressure air duct is provided in combination with a second central body which can be axially moved in an adapted manner and is axially symmetrically connected behind the turbo engine, said second central body, during an exclusive ramjet operation and when the air intake cross-section is blocked and said ram pressure air duct is unblocked, blocks an annular nozzle outlet opening of the turbo engine with respect to ram air flow which flows together downstream of said second central body out of the ram pressure air duct.

21. An engine according to claim 16, wherein a device for the selective blocking or unblocking of the air intake cross-section and of the ram pressure air duct is provided in combination with a second central body which can be axially moved in an adapted manner and is axially symmetrically connected behind the turbo engine, said second central body, during an exclusive ramjet operation and when the air intake cross-section is blocked and said ram pressure air duct is unblocked, blocks an annular nozzle outlet opening of the turbo engine with respect to ram air flow which flows together downstream of said second central body out of the ram pressure air duct.

22. An engine according to claim 16, wherein at least one of the central body and second central body and the ring slide are made of a temperature-resistant material, particularly of a ceramic composite material reinforced by fiber glass.

23. An engine according to claim 12, wherein at least one of the central body and second central body and the ring slide are made of a temperature-resistant material, particularly of a ceramic composite material reinforced by fiber glass.

* * * * *